(No Model.) 2 Sheets—Sheet 1.
C. L. WORK.
VELOCIPEDE.
No. 314,160. Patented Mar. 17, 1885.
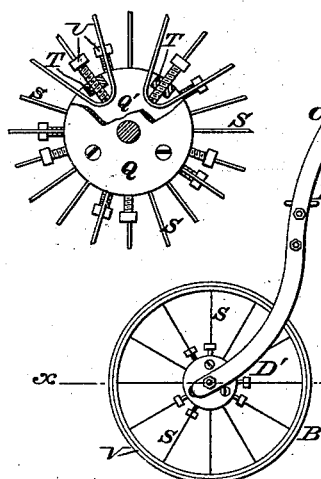
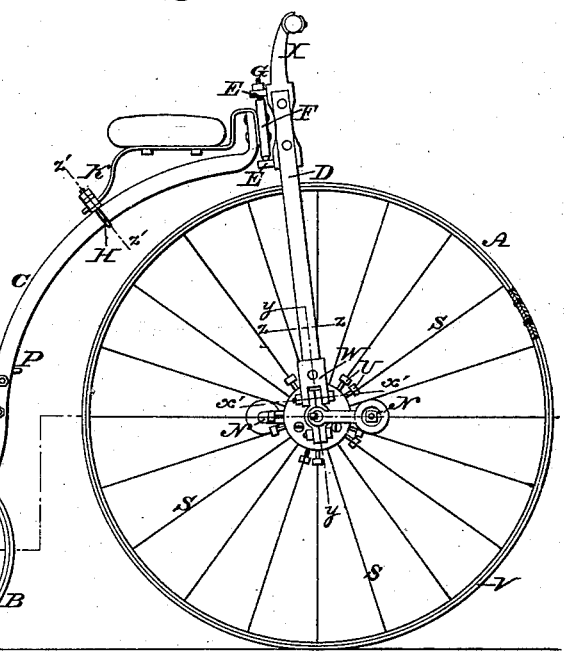
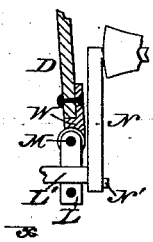
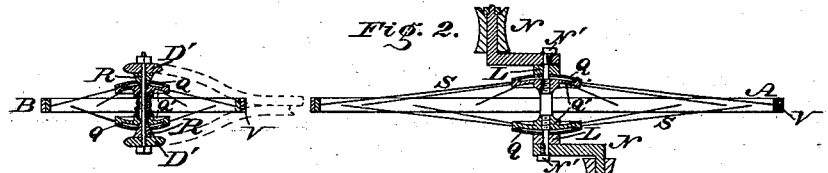
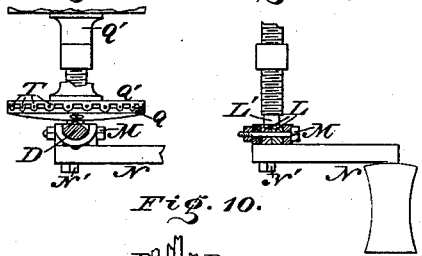
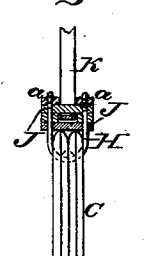
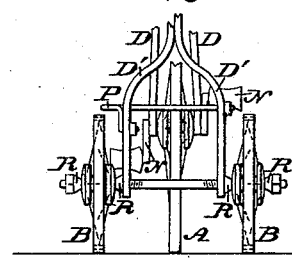
WITNESSES:
L. Douville
W. F. Kircher
INVENTOR:
Chas. L. Work,
BY John A. Wiedersheim
ATTORNEY.

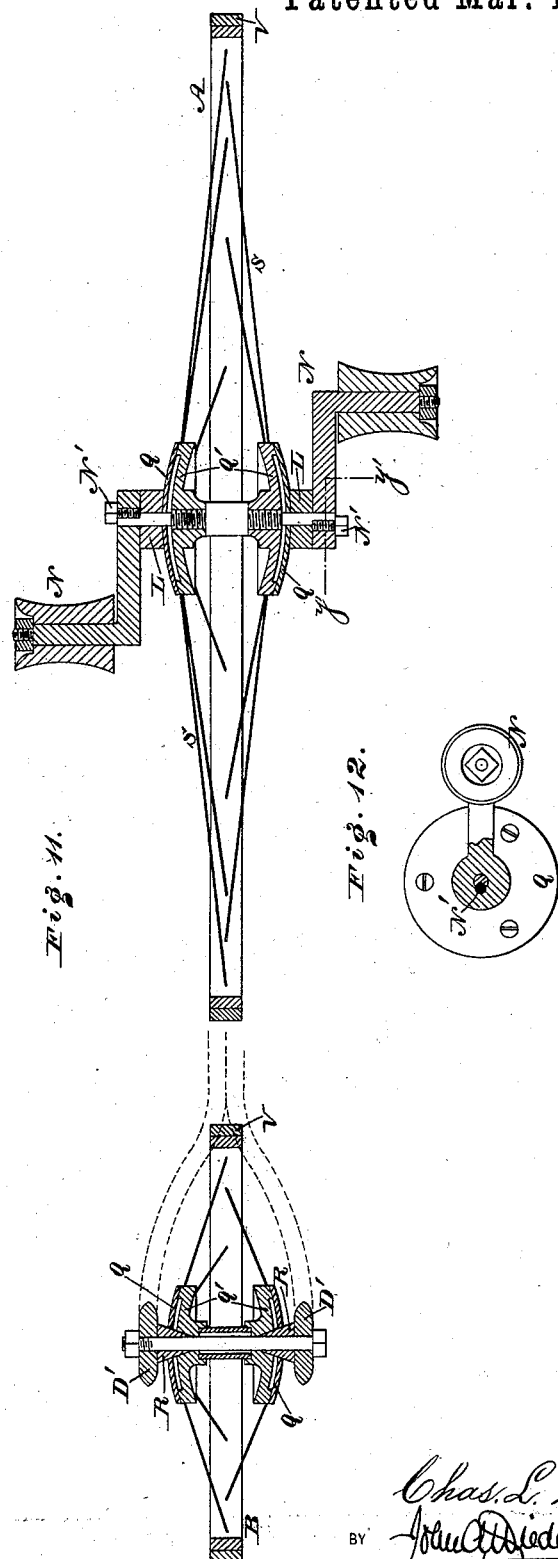

UNITED STATES PATENT OFFICE.

CHARLES L. WORK, OF PHILADELPHIA, PENNSYLVANIA, ASSIGNOR TO THE POPE MANUFACTURING COMPANY, OF BOSTON, MASSACHUSETTS.

VELOCIPEDE.

SPECIFICATION forming part of Letters Patent No. 314,160, dated March 17, 1885.

Application filed May 10, 1882. (No model.)

*To all whom it may concern:*

Be it known that I, CHARLES L. WORK, a citizen of the United States, residing in the city and county of Philadelphia, State of Pennsylvania, have invented a new and useful Improvement in Bicycles and Velocipedes, which improvement is fully set forth in the following specification and accompanying drawings, in which—

Figure 1 is a side elevation of a bicycle embodying my invention. Fig. 2 is a horizontal section thereof in line $x$ $x$, Fig. 1. Fig. 3 is a detached view of a portion of a wheel thereof enlarged. Fig. 4 is a vertical section of a portion enlarged in line $y$ $y$, Fig. 1. Fig. 5 is a vertical section of the pivotal connection of the fork of the steering-wheel and reach or backbone enlarged. Fig. 6 is a horizontal section of a portion enlarged in line $z$ $z$, Fig. 1. Fig. 7 is a horizontal section in line $x'$ $x'$, Fig. 1, enlarged. Fig. 8 is a top or plan view of a portion of the reach enlarged, partly sectional, in line $z'$ $z'$, Fig. 1. Fig. 9 is a sectional view of a segment of the wheel-tire enlarged. Fig. 10 is a rear view showing features of the invention applied to a three-wheel velocipede. Fig. 11 is an enlarged view of Fig. 2. Fig. 12 is a vertical section of a portion in line $y'$ $y'$, Fig. 11.

Similar letters of reference indicate corresponding parts in the several figures.

My invention consists of a novel manner of forming the reach, whereby it possesses great strength and durability.

It further consists of a step formed of one piece of wire or other suitable metal, in combination with a two-part reach fastened together thereby.

It also consists of a novel manner of constructing the hubs of the wheels.

It also consists of novel bearings for the wheels.

It also consists in forming certain parts of oval iron, whereby they are light and strong.

It also consists of other details, as will be hereinafter fully set forth.

Referring to the drawings, A represents the front wheel of a bicycle, and B the hind wheel thereof.

C represents the connecting-reach of the front and hind wheel, the fork D of the front wheel being pivoted to said reach, the rear end of the reach spreading out to form a fork, D', between which the hind wheel is fitted and to which the axle of said wheel is connected. The reach is formed of two pieces of metal, oval in cross-section and welded together a portion of their length at the front part of the reach, thus forming a ribbed or corrugated piece which possesses great strength and durability, the two pieces spreading and forming the fork D', as above referred to, there being no rivets or bolted joints to work loose. The front fork, D, is formed with ears E, which extend horizontally rearward and from the fork, and between them is fitted a vertical block, F, which is rigidly secured to the front of the reach, and has the ears E, pivoted to it as follows: Through the upper ear, E, is passed a screw or stud, G, whose point enters a depression in the top of the block F, and in the lower ear is a conical opening into which is fitted the bottom of said block, of conical form, said lower ear thus acting as a step. By this construction the operation of the turning and steering wheel is readily accomplished, and the pivotal connection of the fork and reach is strong and durable, the piercing of the block for the passage of a bolt being avoided.

H represents a clip which embraces the reach at the rear of the seat and passes through plates J J, between which the end of the seat-support K is located, and has, if desired, a certain amount of vertical play. The ends of the clip are threaded, and provided with nuts $a$ $a$, whereby the plates J are securely clamped to the reach, and the body of the clip tightened against said reach, thus increasing the connection of the two pieces constituting the same, the end of the support K being also properly retained in position. The lower ends of the fork of either wheel are attached to the bearings L of the axle or journals L' by a pivotal bolt, M, whereby said fork and bearings are firmly connected, and while said fork extends in an inclined or diagonal direction the bearings or boxes L occupy a truly horizontal position, and there is no binding of the axle or journals in the bearings, the wheel thus running true at all times.

N represents the operating cranks or treadles of the wheel, which are secured to the axle or journals by screw-bolts N', which are fitted in openings formed by grooves in the peripheries of the axle and the walls of the openings of the cranks, thus firmly connecting the cranks and axles, the heads of the bolts providing convenient means of turning, tightening, or loosening the same.

Attached to the reach C is the step P, which if formed of a piece of wire or other suitable metal bent into step shape and having its ends parallel, said ends being passed transversely and horizontally through the reach and firmly secured thereto by nuts or riveting, thus providing a strong and inexpensive step which is formed of one piece of material, and serving to hold together the two pieces of which the reach is constructed. The wheels are formed with wire spokes which are attached to the hub and tire proper. The crank-hub or hub of the crank-wheel consists of two parts, each formed of disks Q Q', of dishing shape, between which the spokes are clamped, the outer disk, Q, being fixed to the axle of the wheel, and the inner disk, Q', being threaded to engage with threads on the axle, as in Fig. 2, whereby the inner disk may be secured outwardly, thus forcing the inner ends of the spokes against the outer disk, and securely connecting them, as also tightening the spokes and consequently the wheel. The hub of the hind wheel is likewise constructed of disks Q Q', the two sets being connected by a tube or sleeve, through which is passed the axle proper, the ends of which carry conical bearings R, which, being on opposite sides of the hub enter conical openings or recesses in the hub, whereby the wheel rotates on said conical bearings instead of the axle. By this provision the wheel runs true, and as it wears away on its bearings the nuts of the axle are tightened, thus taking up the wear, and causing continued regularity of motion of the wheel. The spokes S are formed of bent wire or round iron, so that each spoke is of two limbs or somewhat V shape, the bend being between two disks of which the hub is constructed. One of said disks has a series of laterally-projecting lips, T, (see Fig. 6,) between the space of which the spokes protrude through, and to each lip is fitted a screw or bolt, U, the point of which is adapted to press against the bend of the spokes. By this provision each spoke may be adjusted and tightened, and a strong and uniform wheel produced, the heads of the screws or bolts being conveniently accessible. When there are two wheels on the same axle, the branches of the rear fork of the reach are employed as nuts for holding the inner cone-bearings in position. (See Fig. 10.) For this purpose the axle is right and left screw-threaded adjacent to the hubs, and the axle or reach may be rotated, whereby the fork tightens against the cone-bearings and serves to hold them firmly in position, and said fork is spread apart and correspondingly strengthened.

V represents the tread of the wheel, formed of a band or strip of rubber, and constituting an elastic tire which is riveted to the tire proper, one head of each rivet being on the inside of the tire proper and the other on the outside of the rubber tire. By this construction an easy-riding and noiseless wheel is produced. Should the rivets come in contact with obstructions, they give or move through the tire, the rubber yielding so that the rivets are not indented or injured, the tire afterward resuming its proper shape. The fork D is made of oval iron, which adds strength to said part and reduces the weight thereof, besides decreasing the lateral projection of the fork, the same construction being applicable to the reach. The bottoms of the two limbs of the fork D are attached to clips W, to which the journal bearings or boxes L are pivoted or swiveled, as has been stated, and the tops of said limbs are rigidly connected to the handle-iron X, the clips and iron being depressed in semi-oval form to receive the limbs of the fork, thus producing a strong structure.

Having thus described my invention, what I claim as new, and desire to secure by Letters Patent, is—

1. A step formed of a single piece of bent metal, in combination with a reach consisting of two parts, the ends of said step being passed through said parts to fasten them together, substantially as set forth.

2. In a bicycle, an axle and a tube or sleeve arranged thereon, in combination with four disks, Q Q', which are secured on said axle and spokes, the said disks being arranged in pairs at the ends of said sleeve, and of concavo-convex shape, clamping the ends of the spokes between them, substantially as and for the purpose set forth.

3. A step constructed from a single piece of metal bent into the form of a step with parallel ends, said ends passing transversely and horizontally through the reach of a bicycle and secured thereto.

4. A wheel having a conically-recessed hub composed of four disks arranged in pairs, longitudinally adjustable on the axle thereof, in combination with a reach having a forked rear end secured to said axle, substantially as and for the purpose set forth.

5. A bicycle-reach constructed of the two pieces of metal oval in cross-section and united together at their sides, thus forming a corrugated reach, substantially as and for the purpose set forth.

6. A bicycle-reach constructed of the two pieces of metal oval in cross-section, and united for a portion of their length, and then spreading to form a fork at the rear, substantially as set forth.

7. A wheel having a conically-recessed hub composed of four disks arranged in pairs and an intervening separate tube arranged with its ends against the inner faces of the inner disks, in combination with a reach having a forked rear end, substantially as and for the purpose set forth.

8. In a bicycle, an axle, in combination with conically-recessed disks arranged in pairs thereon to form a hub and conical bearings arranged on each side of said hub, said bearings being adjustable toward each other in said recesses to take up wear, but having no rotary motion, substantially as and for the purpose set forth.

CHAS. L. WORK.

Witnesses:
JOHN A. WIEDERSHEIM,
A. P. GRANT.